Figure 1:
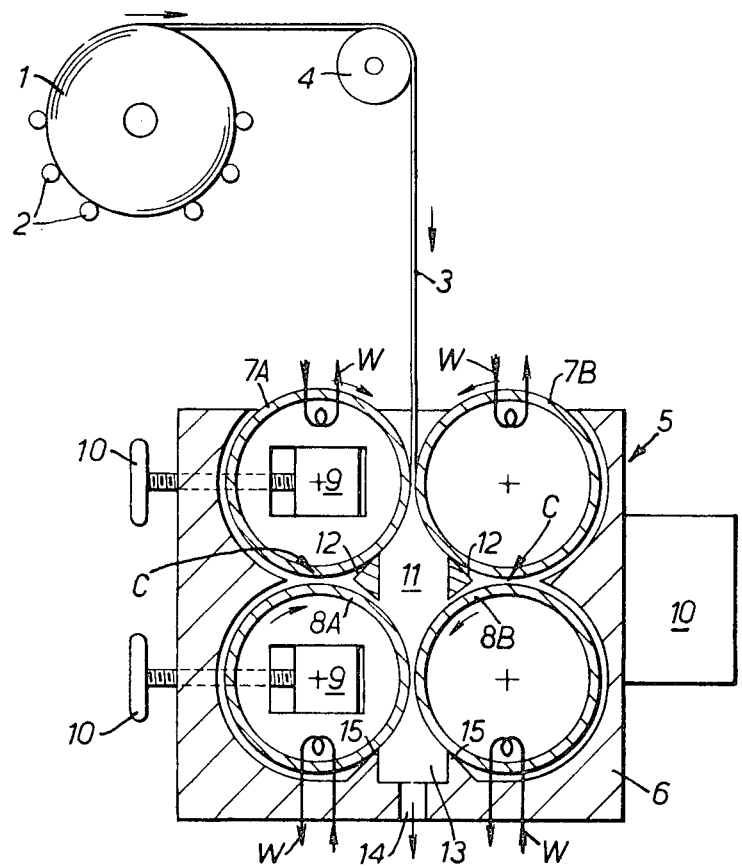

United States Patent

[11] 3,632,091

[72] Inventor   Hugh Ford
                London, England
[21] Appl. No.  844,051
[22] Filed      July 23, 1969
[45] Patented   Jan. 4, 1972
[73] Assignee   Davy Plastics Machinery Limited
                Poole, Dorset, England
[32] Priority   July 23, 1968
[33]            Great Britain
[31]            35005

[54] PROCESSING THERMOPLASTICS MATERIAL
     9 Claims, 2 Drawing Figs.
[52] U.S. Cl. .................................................. 259/187,
                                                259/189, 259/191
[51] Int. Cl. .................................................. B29h 1/00
[50] Field of Search .......................................... 18/2 EM;
                                                        259/6

[56]            References Cited
                UNITED STATES PATENTS
2,645,813   7/1953   Swallow ........................ 18/2 EM X
2,868,517   1/1959   Lasch ........................... 18/2 EM X Primary Examiner—Travis S. McGehee
Attorney—Holcombe, Wetherill & Brisebois ABSTRACT: This invention relates to the preparation of plasticized thermoplastics material. The material, in particulate or strip form, is passed through the gap between the rolls of a rolling mill. A controlled amount of shearing work is performed on the material to effect uniform heating of the material. Coloring or filling matter may be passed between the rolls with the thermoplastics material to be homogeneously distributed, and reinforcing fibers may be placed between two layers of strip material passed between the rolls at the same time to become firmly embedded in the resultant single-layer strip.

INVENTOR
HUGH FORD

PROCESSING THERMOPLASTICS MATERIAL

It is usual for Manufacturers of thermoplastics material such as polyethylene, polypropylene, polyvinylchloride and like thermoplastics polymer material to extrude the material into strip form and subsequently pelletise or otherwise divide the strip of material into small parts before it is delivered to users of the material. The users of the plastics material remelt the divided material sufficiently for it to form a semisolid or liquid mass immediately prior to the material being used for forming plastics articles.

It is believed that it would be more convenient and possibly cheaper for manufactures of the plastics material not to divide the extruded strip into small parts but to coil it and deliver the coils suitably protected to the users of the material. The problem then exists of how the strip of plastics material can be melted prior to it being processed further or used for forming plastics articles. Advantageously, the solution to this problem should also be applicable to the melting of thermoplastics material in the conventional pelletised form, so that the user is able to process plastics materials supplied in either pelletised or strip form in the same way.

According to the present invention, there is provided a method of processing thermoplastics material wherein the material is passed through the gap between at least one pair of closely spaced, processing rolls which perform sufficient mechanical work on the material to cause it to soften to a semisolid or liquid condition.

The invention also provides apparatus for processing thermoplastics material, comprising at least one pair of closely spaced processing rolls, means for driving at least one roll of said pair, means for feeding the material into the gap between the rolls of said pair, and means for collecting processed material issuing from between the rolls of said pair.

In this specification, the term "closely spaced" is to be construed as meaning "spaced sufficiently close to provide the degree of mechanical working on the thermoplastics material to effect the required heating." It is well known that passing material through the gap between two rolls causes shearing within the material. For a given spacing between the rolls, the extent of this shearing will depend on the size of the materials supplied to the rolls, and the speeds of rotation of the rolls. The required spacing, in any particular case, can be found by simple experiment. For example, where a 0.5-inch gap between two 6-inch diameter rolls rotating, respectively, at 180 r.p.m. and at 5 r.p.m., the material is raised to a temperature of about 160° C. and issues from between the rolls in a semimolten condition. Variation in the extent of melting can be effected by altering:

a. the spacing between the rolls;
b. the thickness of the strip material; or
c. the diameters of the rolls, or by making such an alteration in conjunction with an alteration in the relative speeds of the rolls.

Figure 2:
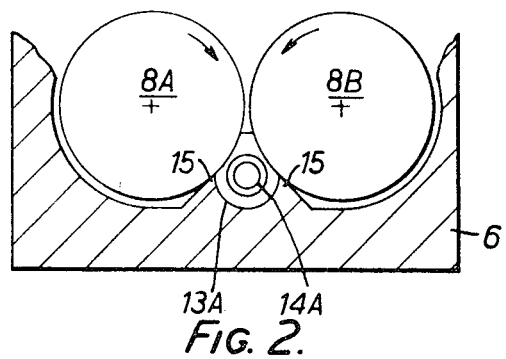

In order that the invention may be properly understood two embodiments of the apparatus according to the invention, and their methods of operation, are described below, by way of example only, with reference to the accompanying drawing, in which:

FIG. 1 shows an arrangement of apparatus for treating a coil of thermoplastics strip material; and FIG. 2 shows a modification to part of the apparatus shown in FIG. 1.

As shown in FIG. 1, a coil 1 of thermoplastics strip material is supported for rotation in a cradle formed of freely rotatable, parallel, bearing rollers 2. The free end 3 of the coiled strip material passes over an idler roller 4 and into a rolling mill assembly 5.

The rolling mill assembly 5 consists of a rigid housing 6 encasing two pairs of rolls 7A, 7B and 8A, 8B. One roll of each pair, 7A and 8A, is mounted in horizontally movable bearing blocks 9, and screw thread adjustment means 10 are provided for varying the gaps between the rolls of each pair. The pairs of rolls are also mounted so that there is always a small clearance gap C between each of the rolls 7A and 7B of one pair and the vertically adjacent roll 8A and 8B of the other pair. The housing cavity accommodating the rolls is open at the top and bottom for supply and discharge of the plastics material, and the walls of the housing cavity conform closely to the adjacent surfaces of the rolls.

Drive means 10 are independently and detachably connected to each of the rolls by conventional means (not shown) for independently varying the speed and direction of rotation of each roll. When the rolls 7A and 7B are driven in opposite directions, as shown by the arrows in FIG. 1, the speed differential between these two rolls is adjusted as required and plastics strip material from the coil is fed through the gap between the rolls 7A and 7B and issues into space 11 between the four rolls in a softened condition.

Wedge-sectioned scrapers 12 are mounted adjacent the cylindrical surfaces of rolls 7A and 7B and serve to remove plastics material adhering to these rolls. The scrapers 12 are also arranged to help seal the space 11 against egress of plastics material through the gaps C between the rolls 7A and 8A and between the rolls 7B and 8B. Material in the space 11 is therefore passed through the gap between the rolls 8A and 8B and is collected in a gutter 13 for discharge through an outlet opening 14.

In the apparatus shown in FIG. 1, rolls 7A and 8A are both driven in a clockwise direction and rolls 7B and 8B are both driven in an anticlockwise direction. The rolls 8A and 8B thus assist the scrapers 12 in preventing egress of plastics material from the space 11 through the clearance gaps C as well as causing such additional shear in the plastics material as may be required for melting.

Sealing edges 15 projecting from the wall of the housing 6 on opposite sides of the gutter 13 bear against the cylindrical surface of the rolls 8A and 8B to prevent material issuing from between the rolls 8A and 8B from being carried away from the gutter 13 on the surfaces of these rolls.

Each of the rolls 7A, 7B, 8A and 8B is hollow and encloses ducts W (shown schematically in FIG. 1) for the circulation of heating or cooling water. Heating water is circulated where greater heating of plastics material is required, and cooling water is circulated where the temperature of the plastics material must be maintained below a certain level, for example, the temperature at which a plastics material such as polyvinylchloride is degraded.

FIG. 2 shows part of an apparatus which is similar to that shown in FIG. 1, but differs in that the gutter 13A is part circular rather than rectangular in cross section, and an extrusion screw 14A is mounted in the gutter 13A and extends into a conventional barrel (not shown) outside the housing. The outlet opening is thus formed coaxially around the extruder screw 14A rather than at the bottom of the gutter. In all other respects the modified apparatus shown in FIG. 2 is the same as that shown in FIG. 1, and the only difference in operation is that plastics material is discharged horizontally from the apparatus by the extrusion screw 14A rather than vertically.

The softened plastics material discharged from the rolling mill assembly may be transferred, for example, to a Banbury mixer for further processing or to the pressure section of an extruder, as in FIG. 2, or to a melt pump. However, by enclosing the rolls of the rolling mill assembly 5 in a rigid housing, considerable pressure can be built-up on the downstream side of the second pair of rolls 8A and 8B so as to obviate the need for an extruder.

As the speeds of the rolls of each pair may be varied relative to each other and relative to the rate of feed of strip material, it may be necessary to roughen the surface of at least one of the rolls in order to increase the rate at which the material is passed through the gap between the rolls.

Where the material fed into the gap between the rolls is in particulate or pelletised form a suitable hopper with an elongate discharge slot aligned with the gap between the rolls may be provided. Pellets are thus dropped through the hopper into gap between the rolls.

One advantage of the apparatus described above, over the conventional extrusion plasticizer is that a more exact control of the shearing work put into the plastics material can be ensured, and closer control of temperature is possible since the material passes through an exactly specified path while it is under deformation and pressure. Moreover, treatment of the material is more uniform and the material is softened more homogeneously.

The present invention may also be applied to the uniform distribution of additive material for coloring or filling the thermoplastics material, or for producing reinforced strips of thermoplastics material. In one such application, additive material is provided as a layer of particulate or film material on at least one of the rolls between which the thermoplastics material is passed. Where the thermoplastics material is in strip form, one or more layers of strip material may be fed into the gap between a pair of rolls at the same time and the additive material may be provided as a coating on at least one surface of one such layer. Where a plurality of layers of strip material are fed into the gap between a pair of rolls at the same time, reinforcing fibers may be provided on at least one surface of at least one of the layers so that after passage between the rolls they become embedded in a single-layer, composite strip.

I claim:

1. Apparatus for processing thermoplastics material comprising a housing, a pair of rolls mounted for rotation in the housing, said rolls being arranged side by side with their longitudinal axes parallel in a substantially horizontal plane and a clearance gap therebetween, an inlet in the housing positioned above said gap through which thermoplastics material is introduced into the gap, means for causing relative rotation between the rolls in such a direction that the surfaces of said rolls adjacent said gap move so that material introduced into the gap is drawn through the gap to cause the material to soften to a semisolid or liquid condition, the gap between the rolls leading to a recess within said housing beneath the rolls and into which said softened material is forced by the action of the rolls, said recess having an outlet and being defined in part by a pair of scraper seals acting against the underside of the rolls to prevent softened thermoplastics material leaving the recess while adhering to the rolls.

2. Apparatus as claimed in claim 1 in which the outlet from said recess is defined by a clearance gap between a further pair of rolls mounted for rotation in the housing, said further pair of rolls being arranged side by side with their longitudinal axes parallel in a substantially horizontal plane and a gap therebetween, said apparatus also comprising means for causing relative rotation between the further rolls in such a direction that the surfaces of said further rolls adjacent the gap therebetween move so that material introduced into the gap between said further rolls from the recess is forced through that gap, a gutter positioned beneath said last-mentioned gap, an outlet from said gutter, and a pair of scraper seals associated with the gutter and acting against the underside of the rolls to prevent softened thermoplastics material leaving the gutter while adhering to the rolls.

3. Apparatus as claimed in claim 2 including means for adjusting the position of one roll of each pair relative to the other roll of the pair to vary the width of the gap therebetween.

4. Apparatus for processing a thermoplastics material comprising a housing, a pair of rolls mounted for rotation in the housing, said rolls being arranged side by side with their longitudinal axes parallel and a clearance gap therebetween, an inlet in the housing positioned adjacent said gap through which thermoplastics material is introduced into the gap, means for causing relative rotation between the rolls in such a direction that the surfaces of said rolls adjacent said gap force material introduced in the gap directly through the gap to cause the material to soften to a semisolid or liquid condition, the gap between the rolls leading to a recess within said housing and into which said softened material is forced by the action of the rolls, said recess having an outlet and being defined in part by a pair of scraper seals acting against the rolls in the vicinity of the gap to prevent softened thermoplastics material leaving the recess while adhering to the rolls.

5. Apparatus according to claim 1, wherein drive means are independently and detachably connected to each of the rolls of said pair for independently varying the speed and direction of rotation of the rolls of said pair.

6. Apparatus according to any of claim 1, wherein at least one roll of said pair incorporates heat transfer means for controlling the temperature of said roll.

7. Apparatus according to claim 1, wherein the rolling surface of at least one of the rolls of said pair is roughened so as to increase the rate at which material is passed through the gap between the rolls of said pair.

8. Apparatus according to claim 2, wherein the gutter is part circular in cross section and accommodates an extrusion screw for discharging collected thermoplastics material through an aperture coaxially aligned with the extrusion screw.

9. Apparatus according to claim 1, wherein said means for feeding material into the gap between said pair of rolls comprises a hopper for particulate thermoplastics material which has an elongate discharge slot aligned with said gap.

* * * * *